Figure 1:
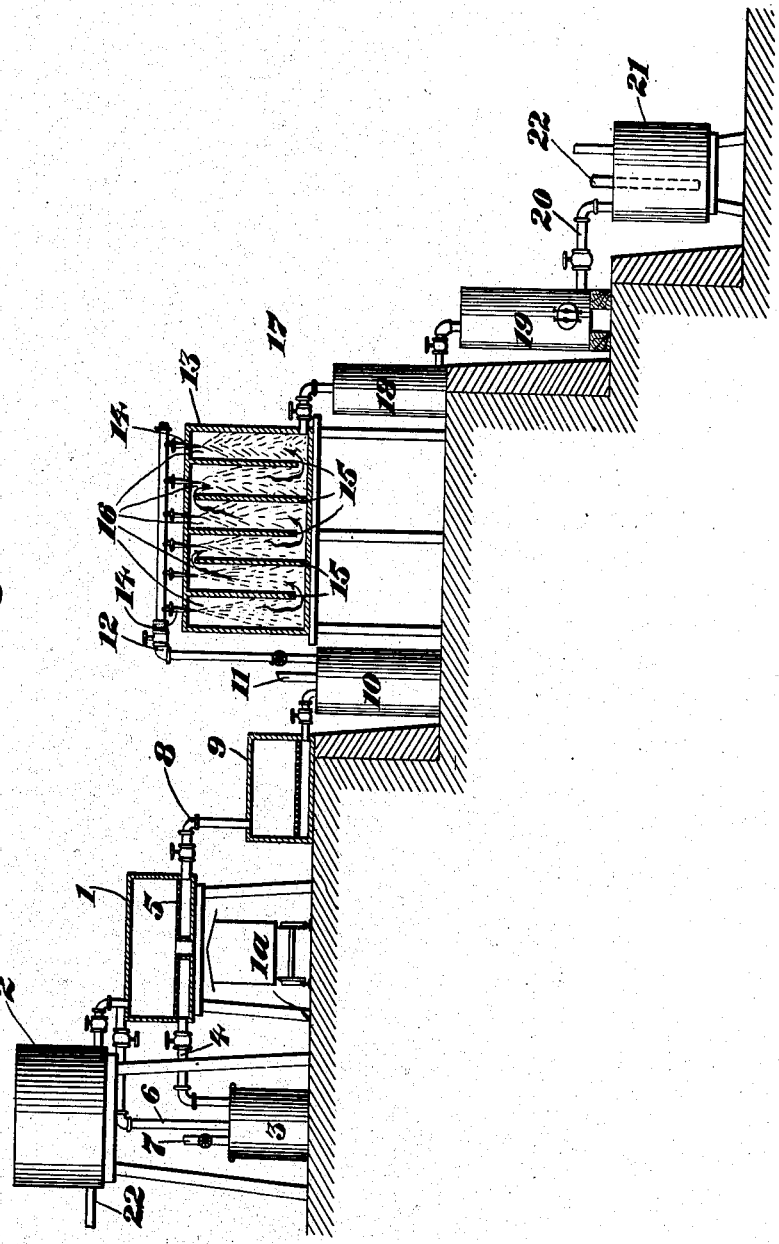

No. 894,902. PATENTED AUG. 4, 1908.
W. B. POTTER.
METHOD OF RECOVERING COPPER FROM ORES.
APPLICATION FILED AUG. 1, 1907.

2 SHEETS—SHEET 1.

Witnesses:
Chas. C. Becker.
Elliott R. Goldsmith.

Inventor:
William B. Potter,
By Hugh K. Wagner,
His Attorney.

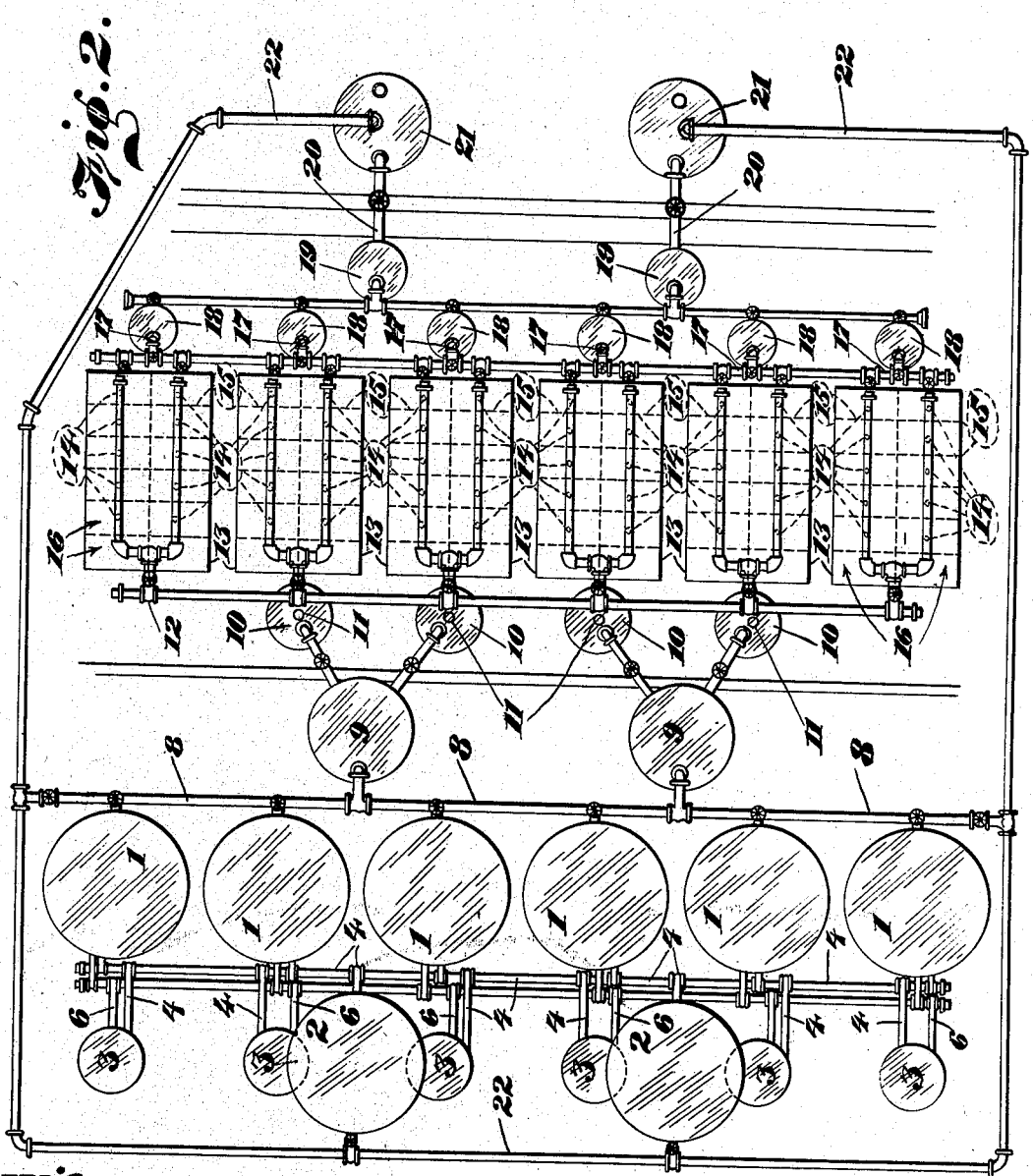

UNITED STATES PATENT OFFICE.

WILLIAM B. POTTER, OF ST. LOUIS, MISSOURI, ASSIGNOR TO ESMERALDA COPPER PRECIPITATING COMPANY, OF CHICAGO, ILLINOIS, A CORPORATION OF ARIZONA TERRITORY.

METHOD OF RECOVERING COPPER FROM ORES.

No. 894,902.　　　　Specification of Letters Patent.　　　Patented Aug. 4, 1908.

Application filed August 1, 1907. Serial No. 386,531.

*To all whom it may concern:*

Be it known that I, WILLIAM B. POTTER, a citizen of the United States, residing at the city of St. Louis and State of Missouri, have invented certain new and useful Improvements in Methods of Recovering Copper from its Ores, of which the following is a specification, reference being had therein to the accompanying drawings.

This invention has for its object to obtain high grade metallic copper directly from its low grade ores by a process involving solution and precipitation. The process utilizes sulfur dioxid as a reagent with which to charge a neutral solution of cupric sulfate, the precipitation being then accomplished by subjecting the sulfur dioxid-charged solution to proper heat and pressure. The precipitation of the copper is accompanied by the generation of free sulfuric acid, and this acid (in the residual or spent liquor remaining after the precipitation of copper from the original charged solution) is used as a solvent to leach additional copper from the ore. The operations are then repeated, as before, the cupric sulfate thus prepared being charged with sulfur dioxid and subjected to heat and pressure, resulting in the precipitation of more copper and the regeneration of fresh quantities of acid, this last-generated acid being, in turn, used as a solvent with which to make more cupric sulfate. The process, accordingly, is a regenerative one in that each time copper is precipitated large quantities of free sulfuric acid are generated, more than sufficient in quantity to dissolve as much copper as was previously precipitated. The process, also, is a continuous one, and one in which the operations may be repeated indefinitely, without the use of any solvent other than that found in the spent solution after each precipitation of copper. Such large quantities of free sulfuric acid are generated that there is a large excess over that necessary to dissolve the copper, thus permitting the treatment of copper ores having considerable soluble gangue matter, and, in the case of ores not having soluble gangue matter sufficient to take up the free acid over and above that required for the copper, a cheap neutralizing agent like limestone, which is available almost everywhere, can be used to dispose of such excess of acid. The hereindescribed process, accordingly, can advantageously be applied to a very wide range of ores having more or less soluble ingredients in the gangue matter, which ingredients would cause too great a waste of the solvent in the case of non-regenerative copper-leaching processes, or processes which, being regenerative, produce only sufficient solvent to leach the copper. In other words all, or nearly all, prior copper-leaching processes require either a constant replenishing of the solvent from outside sources, or, if any solvent is produced in the process, it is only sufficient to dissolve the copper without allowing any for soluble ingredients in the gangue. By such prior processes, therefore, only those ores of copper can be treated, if any, which have a quartz or insoluble silicious gangue. The treatment of solutions containing excessive quantities of acid, generated incidentally in the precipitation of the copper, is hereinafter described, and it is in this method, in those steps by which the precipitation is effected, and in the utilization of the free acid for leaching the proper quantity of copper from fresh lots of ore, that the principal points of novelty of the invention reside.

In the drawings forming part of this specification, in which like numbers of reference denote like parts wherever they occur, Figure 1 is a diagrammatic view of the main parts of the apparatus, partly in elevation and partly in section; and Fig. 2 is a top plan view.

It should be understood, however, that, as this invention relates primarily to a process, the apparatus shown and described is only illustrative, and that other forms and arrangements of apparatus may be used for practicing said process.

The ore from which the copper is to be extracted is first crushed, and is then leached or digested in any suitable receptacle (such, for example, as a series of stationary lead-lined tanks 1, or rotating, acid-proof barrels) with dilute sulfuric acid of about 10% strength. The sulfuric acid required to make up that acid solution used for starting the process is the only acid that must be supplied from outside sources, and the quantity provided need be sufficient for leaching only one round or charge of ore. Afterward, in the regular working of the process, the leaching of copper from the ore is done entirely with the spent liquor or solution remaining after the precipitation of copper. Tanks 2 are used for storing leaching solutions ready to be run into the tanks 1. The operation of leaching the ore with the first acid solution in starting, and with the spent-liquor acid solutions in regular working, is the same in all cases. This leaching action, where stationary tanks are used, is secured by passing the solution from one ore tank 1 to another until sufficient copper is leached, the weakest solution being always used on fresher ore and the strongest solution on ore with the least copper remaining therein. In this way the ore is readily deprived of its copper and the leaching solution approaches neutrality, or that point at which all the free acid is neutralized by the copper and other soluble ingredients in the ore.

The preferred manner of handling the leaching solution is as follows: Each ore tank 1 is connected with a sump tank 3 (or plurality of sump tanks) into which the solution can be run by pipes 4 after passing through the ore and after being strained by the perforated false bottom 5 of the ore tank. From this sump tank the solution can be raised and delivered by pipes 6 into the next, or any other, ore tank in the series, and, after percolating through the ore therein, it is allowed to run into its sump tank, from whence it is raised again to any other ore tank in the series, and so on, until there has been sufficient exposure of the solution to the ore to secure for the solution the desired content of copper. By means of suitable pipe connections 7, compressed air at low pressure is applied upon the surface of the solution in the air-tight, covered sump tanks, and the solution is thereby raised and delivered to any ore tank in the series, and thus the leaching of the ore can be followed through the tanks in any order that may be desired. Ore from which the copper has been thus leached is then subjected to washing with fresh water to remove the entangled solution containing copper, after which the spent ore is discharged into cars 1ª below as tailings, and a new or fresh lot of ore charged into the ore tank. On the other hand, the solution which has taken up sufficient copper, if still acid, is carried by pipes 8 to a tank 9 containing crushed limestone, and the remaining free sulfuric acid is neutralized by the calcium of the limestone, this reaction yielding calcium sulfate, which, being insoluble, settles to the bottom of the tank, leaving the clear neutral solution of cupric sulfate ready for the next step in the process.

In treating any definite ore of copper it is easy to determine to what extent the acid solution should be exposed to the ore and allowed to dissolve the contained copper before it is passed on to the tank of crushed limestone to complete the neutralizing of the free acid, and due care should be taken to produce regularly a solution having the proper normal content of copper. The most suitable content of copper for the cupric sulfate solution is 6% of copper, which solution will have a specific gravity of about 1.17, though the specific gravity of the solution will vary to some extent, depending on the nature and quantity of impurities present. It is impracticable to have the cupric sulfate solution contain more than 6% of copper, because in a cupric sulfate solution containing about 7% of copper the cupric sulfate begins to crystallize out. The neutral cupric sulfate solution, produced as above, is then allowed to run into lead-lined steel pressure tanks 10. These tanks are made with flanged steel covers which are bolted on, and, through a suitable pipe 11 in the cover, compressed air at suitable pressure is applied above the surface of the solution, which pressure forces the solution through the exit pipe 12, which pipe extends from near the bottom of the tank to the top of the absorption apparatus 13, terminating in sprayers 14, causing the solution to be delivered to the top of the absorption apparatus 13. Said apparatus comprises a large tank divided by partitions 15 into a plurality of vertical compartments 16, which partitions extend alternately from the top and the bottom of the vat 13. Through these compartments sulfur dioxid gas is forced, traveling down and up in the serpentine path indicated by the arrows, through all the vertical compartments, finally passing out at the top of the last compartment, from which, if any sulfur dioxid gas remains, it is delivered to the foot of a tower of suitable construction which is filled with coke or other similar material, the gases passing upward and coming intimately in contact with cupric sulfate solution which trickles down from the tower top. If such a tower is used the neutral cupric sulfate solution will be delivered first to the top of the tower, will pass downwardly therethrough, then run from the bottom of the tower into the pressure tanks 10 to be forced through the sprayers 14 into the several compartments 16 of the main absorption apparatus 13. By means of such an absorption apparatus the cupric sulfate solution is charged with an amount of sulfur dioxid equal to 50% of the copper contained in the solution charged. The cupric sulfate solution having thus been charged with sulfur dioxid, is run through pipe 17 into the storage tanks 18, ready for the third step in the process, viz., the precipitation. This is effected in a boiler-like tank 19 of convenient size, which tank may be of such construction as to permit heating of the solution by the direct application of fuel as in the case of a steam boiler, or the solution may be heated indirectly by passing steam through a coil of brass or other acid-resisting and good conducting pipe, set in the tank. By suitable disposition of these steam pipes, supplemented with a steam jacket if desired, sufficient heating surface can be employed and the solution thus readily heated to a temperature of 260° F., while the pressure at the same time is allowed to reach 100 lbs. per square inch.

In filling the precipitation tank with the cupric sulfate solution care should be taken that the charge fills the tank, leaving only sufficient space for the expansion of the solution as it becomes heated, so that when expanded it will nearly if not quite fill the tank. When the precipitation tank is filled in this way there is no escape of the sulfur dioxid from the solution, and the pressure of 100 lbs. to the square inch is readily developed when the solution is heated to the proper temperature of 260° F. Under this combination of high pressure and high temperature the reaction takes place clearly and definitely, causing the precipitation of thirty-five to forty per cent. of the copper in the solution as pure metallic copper, the remainder of the copper remaining in solution in the spent liquor as cupric sulfate, while, at the same time, an amount of free sulfuric acid is developed sufficient to dissolve about two and a half times as much copper as was precipitated in the form of metallic copper from the solution.

The time consumed in bringing up the solution to the required heat and pressure is immaterial, efficiency and economy in the application of the heat being all that it is necessary to observe. Under favorable conditions the heating may be effected in from fifteen to thirty minutes. The time during which it is desirable to hold the solution under the combined heat and pressure depends upon the strength of the solution, varying inversely as the strength. For a solution having approximately six per cent. of copper about one hour is sufficient to produce very satisfactory results.

The metallic copper, which is exceedingly pure and is in a fibrous, moss-like, spongy condition, must be washed with fresh water to remove all the entangled spent solution. It can then be pressed into ingot molds, thus producing solid ingots of copper ready for shipment. The copper is of such high grade that it needs no refining, nor even melting, to put it in ingot form for shipment.

The spent solution, on the removal of the copper, and after being run through pipes 20 into tanks 21 and through an ordinary filter to remove loose particles of metallic copper, is ready to be forced up through pipes 22 to the stock solution tanks 2 in condition for use in leaching more ore. The solution, being still hot, will act more readily in dissolving the copper from the ore and thus the leaching of the ore will be expedited, and, at the same time, the solution, taking some hours to pass through the several ore tanks and limestone tank for completing the neutralizing of the free acid, will have an opportunity to cool down to a normal temperature so that it can be charged again with sulfur dioxid. The process thus consists of a repetition of the three essential steps or operations, viz., leaching the ore to give the solution the necessary strength of cupric sulfate, with the completion of the neutralizing of the free acid by passing over limestone; second, charging this neutral cupric sulfate solution with an amount of sulfur dioxid equal to about 50% of the copper in the solution; and third, precipitating thirty-five to forty per cent. of the copper in the solution as pure metallic copper, leaving the solution with the remainder of the copper and a large excess of free sulfuric acid to be used again for leaching fresh charges of ore.

A modification of the above process might, in some cases, prove more desirable, as follows: Instead of partly neutralizing the acid of the leaching solution with ore and completing the neutralization with limestone, the whole of the neutralizing may be effected by continued exposure of the solution to the ore, proceeding with the charging of this solution with sulfur dioxid and precipitating thirty-five to forty per cent. of the copper in the solution as before. If the ore treated does not contain enough soluble gangue matter to neutralize the free acid, over and above that required to dissolve a new portion of copper to replace that previously precipitated, the cupric sulfate solution, kept to its normal content of 6% of copper, would with each round of operations repeatedly increase in amount and in time exceed the capacity of the plant to handle it. This increase is about one-third with each precipitation. To obviate this and to keep the solutions approximately uniform in amount and normal in content of copper, about two-thirds of the spent solution (instead of all of it, as in the other method herein described) is returned through pipe 22 to leach ore until neutralized, and the remainder is delivered to the limestone tanks by pipes 22 and 8 and the neutralization is effected by means of limestone alone. The operations of charging with sulfur dioxid and precipitating under combined heat and pressure, already described in referring to the other method, are applied in a similar way, but separately, to the ore-neutralized solution, and to the limestone-neutralized solution. To keep the solution which is neutralized with ore normal in volume the part removed for treatment with limestone is replaced with water, while, on the other hand, that part of the solution which is neutralized with limestone instead of with ore, will be below the normal 6% copper content, to which it may be brought up by evaporating the excess of water. When brought to the normal content of copper the charging with sulfur dioxid and precipitation take place in just the same manner as already described. The spent liquor from the precipitation of the limestone-neutralized solution is sent back to the limestone tanks each time for neutralizing before charging with sulfur dioxid.

By a repetition of the several operations of either of the two methods described all the copper is extracted and the solutions are kept regular in volume and normal in content of copper, while all the copper is precipitated, and by the same method of precipitation. The extraction of the copper from the solution is, therefore, complete, and losses are almost inappreciable.

The sulfur dioxid gas for charging solutions as above, may be obtained, in the case of treating sulfid ores, from the roasting of these ores required to change the ore from copper sulfid to copper oxid, which latter is very soluble in the sulfuric acid leaching solutions. The sulfur gases resulting from this roasting consists mainly of sulfur dioxid and thus may be utilized for charging the cupric sulfate solutions. The burning or roasting of iron pyrites may, also, in some cases serve as a convenient source of sulfur dioxid, but the usual source of supply when treating oxidized ores, such as natural oxid, carbonates, or silicates of copper, would be from the burning of sulfur. In roasting sulfid ores of copper or iron pyrites, one of the well known types of muffle roasting furnaces should be used in order to secure gases richer in sulfur dioxid than is obtainable from the ordinary roasting furnaces where the fuel-combustion gases are allowed to mingle with the gases resulting from the roasting of the ore.

Any of the well known types of sulfur burners, commonly employed in the sulfite pulp mills, is suitable for burning sulfur to produce the sulfur dioxid. In the drawings accompanying this specification no roasting furnace or sulfur burner is shown, as no particular means or method of producing sulfur dioxid is claimed in connection with the process for producing metallic copper herein described.

A notable feature in this copper-leaching process, and one possessing decided advantages, is that, although the same solutions are used over and over again, with only such addition of fresh water as may be incidental to the washing of the leached ore before the latter is discharged as tailings, and to the making up of waste naturally occurring in handling, these leaching solutions never can become foul from the repeated additions of outside soluble ingredients from the gangue of the ore, such as lime, alumina, iron, etc. All such impurities that may be dissolved as sulfate during the leaching of the ore, being practically insoluble in neutral solutions, will be deposited in the limestone tanks or ore tanks, whenever the solutions approach the neutral condition. The solutions, therefore, when ready for charging with sulfur dioxid gas previous to precipitation, are of necessity clear and practically free from any of the outside impurities referred to, so that there is no possibility of interference with the progress of the operations, nor can the copper, when precipitated, be contaminated by any of them, not even to a slight degree.

While this process is peculiarly and specially adapted for obtaining copper from its ores, and, hence, for the treatment of ores in which copper is the important metal to be extracted, it may be used to advantage for the treatment of ores carrying gold and silver as well. In the latter case, after the copper has been extracted by this process, the residual ores or tailings are in a condition especially favorable for the application of well-known methods, such as cyanidation, chlorination, or amalgamation, for the saving of the precious metals, thus permitting a more complete extraction of the latter and at much lower cost than if the ores had not been previously treated for obtaining the copper.

Having thus described my said invention, what I claim and desire to secure by Letters-Patent is:

1. The herein-described process of recovering copper from its ores, which consists in leaching the ore with reagent suitable to form a neutral cupric sulfate solution, charging the solution with sulfur dioxid, and, thereafter, heating said solution to a temperature of approximately 260° Fahrenheit, and subjecting same to a pressure of approximately 100 pounds per square inch.

2. The herein-described process of recovering copper from its ores, which consists in leaching the ore with reagent suitable to form a neutral cupric sulfate solution, charging the solution with sulfur dioxid, heating said solution to a temperature of approximately 260° Fahrenheit, subjecting same to a pressure of approximately 100 pounds per square inch, and subsequently neutralizing the excess of sulfuric acid formed.

3. The herein-described process of recovering copper from its ores, which consists in leaching the ore with reagent suitable to form a neutral cupric sulfate solution, charging the solution with sulfur dioxid, heating said solution to a temperature of approximately 260° Fahrenheit, subjecting same to a pressure of approximately 100 pounds per square inch, and subsequently neutralizing the excess of sulfuric acid formed as fast as generated.

4. The herein-described process of recovering copper from its ores, which consists in leaching the ore with reagent suitable to form a neutral cupric sulfate solution, charging the solution with sulfur dioxid, and, thereafter, simultaneously heating said solution to a temperature of approximately 260° Fahrenheit, and subjecting same to a pressure of approximately 100 pounds per square inch.

5. The herein-described process of recovering copper from its ores, which consists in leaching the ore with reagent suitable to form a cupric sulfate solution, any free acid remaining being neutralized by contact with limestone or other suitable material, charging the resulting neutral cupric sulfate solution with sulfur dioxid, and, thereafter, heating said solution sufficiently high above the boiling point and under pressure suited for the precipitation of metallic copper, using the resulting spent solution with its content of free acid for dissolving copper from a new lot of ore, and completing the neutralization of the free acid with limestone for a new precipitation of metallic copper under suitable heat and pressure, after charging with sulfur dioxid.

6. The herein-described process of recovering copper from its ores, which consists in leaching the ore with reagent suitable to form a neutral cupric sulfate solution, charging the solution with sulfur dioxid, and, thereafter, heating said solution sufficiently high above the boiling point and under pressure suited for the precipitation of metallic copper, using a part of the resulting spent solution with its content of free acid for dissolving copper from a new lot of ore until neutral for a new precipitation of metallic copper under suitable heat and pressure after charging with sulfur dioxid, and neutralizing the free sulfuric acid in the remainder of the spent solution, evaporating said neutralized solution to original strength charging with sulfur dioxid, and precipitating metallic copper therefrom by applying suitable heat and pressure.

7. The herein-described process of recovering copper from its ores, which consists in leaching the ore with reagent suitable to form a neutral cupric sulfate solution, charging the solution with sulfur dioxid, and, thereafter, heating the solution sufficiently high above the boiling point and under pressure suited for the precipitation of metallic copper, and neutralizing all of the free sulfuric acid contained in the spent solution, evaporating the thus neutralized solution to original strength, charging same with sulfur dioxid, and precipitating metallic copper therefrom by applying suitable heat and pressure thereto.

8. The herein-described process of recovering copper from its ores, which consists in leaching the ores with a reagent suitable to form a neutral cupric sulfate solution, charging the solution with sulfur dioxid, and, thereafter, heating the solution sufficiently high above the boiling point and under pressure suited for the precipitation of metallic copper, and neutralizing a part of the free sulfuric acid contained in the spent solution, evaporating the thus neutralized solution to original strength, charging same with sulfur dioxid, and precipitating metallic copper therefrom by applying suitable heat and pressure thereto.

In testimony whereof I have affixed my signature in presence of two witnesses.

WILLIAM B. POTTER.

Witnesses:
CHAS. A. BECKER,
GLADYS WALTON.